H. H. FISCHER.
TIRE RIM TOOL.
APPLICATION FILED MAR. 5, 1920.

1,366,173.

Patented Jan. 18, 1921.

WITNESSES

INVENTOR
HERMAN H. FISCHER,
BY Munn & Co
ATTORNEYS

UNITED STATES PATENT OFFICE.

HERMAN HENRY FISCHER, OF LEBANON, PENNSYLVANIA, ASSIGNOR OF ONE-HALF TO BENJAMIN F. PATSCHKE, OF LEBANON, PENNSYLVANIA.

TIRE-RIM TOOL.

1,366,173.  Specification of Letters Patent.  Patented Jan. 18, 1921.

Application filed March 5, 1920. Serial No. 363,376.

*To all whom it may concern:*

Be it known that I, HERMAN H. FISCHER, a citizen of the United States, and a resident of Lebanon, in the county of Lebanon and State of Pennsylvania, have invented a new and Improved Tire-Rim Tool, of which the following is a full, clear, and exact description.

The invention relates to appliances for removing a split demountable rim from a tire or replacing the rim on the tire.

The object of the invention is to provide a new and improved tire rim tool which is simple and durable in construction, easily placed in position and arranged to require comparatively little physical exertion on the part of the user to successfully manipulate the tool.

Another object is to provide a rim tool which is exceedingly compact, takes up little room, and is not liable to get easily out of order.

Another object is to make provision for the use of the rim tool on tire rims varying somewhat in diameter.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
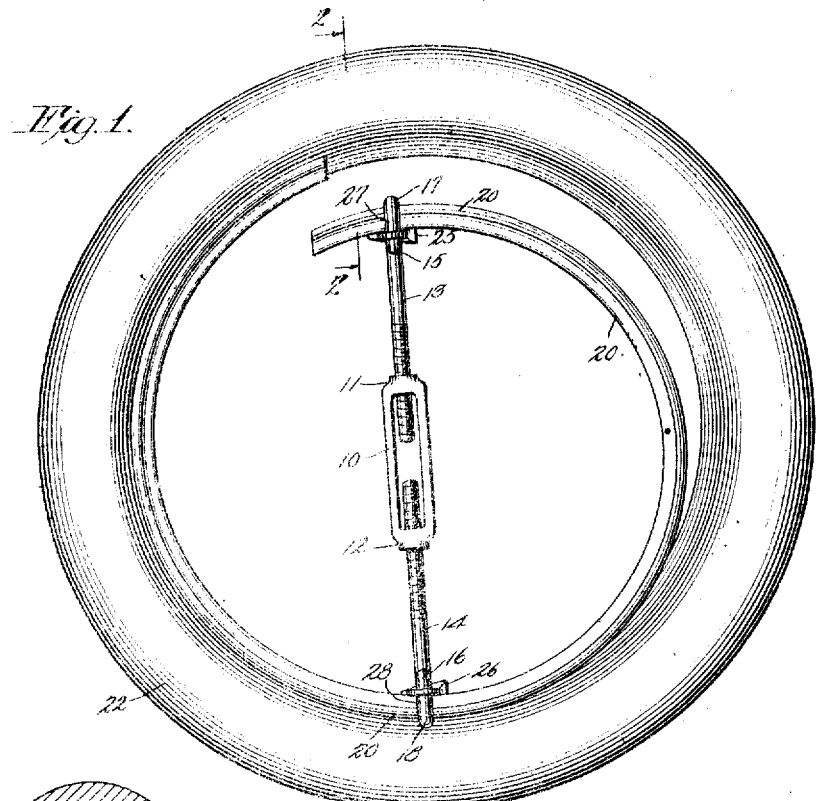
Figure 1 is a side elevation of the tire rim tool as applied and holding the rim in contracted position for removal of the tire from the rim or replacing the tire on the rim.
Figure 2:
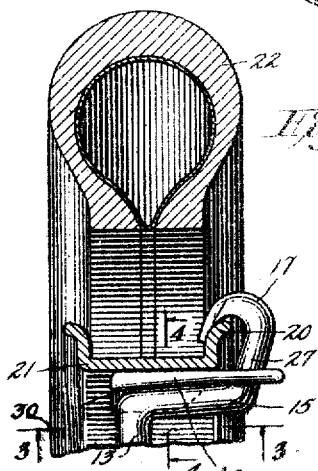
Fig. 2 is an enlarged cross section of the same on the line 2—2 of Fig. 1.
Figure 3:
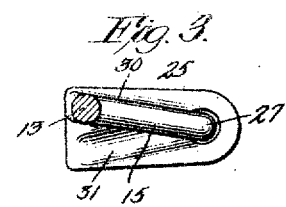
Fig. 3 is a sectional plan view of the same on the line 3—3 of Fig. 2.

A turnbuckle 10 is provided at the ends 11 and 12 with right and left hand threads screwing on the correspondingly threaded inner ends of turnbuckle rods 13 and 14 provided at their outer ends with angular arms 15 and 16 terminating in hooks 17 and 18 adapted to hook onto one of the flanges 20 of the usual split rim 21 adapted to carry a tire 22.

It is understood that the hook 17 engages the flange 20 of the rim 21 adjacent one end thereof while the other hook 18 engages the flange 20 approximately diametrically opposite the portion engaged by the hook 17, as will be readily understood by reference to Fig. 1. When the hooks 17 and 18 are in engagement with the flange 20 of the rim 21 as described, and the turnbuckle 10 is turned with a view to move the turnbuckle rods 13 and 14 toward each other then the split end of the rim 21 is moved inward to contract the rim to allow convenient removal of the tire 22 from the rim or replacing of the tire on the rim as the case may be.

In order to equalize the pull of the turnbuckle rods 13 and 14 on the rim 21, use is made of equalizing members 25 and 26 in the form of plates mounted to swing on the shanks 27 and 28 of the hooks 17 and 18. The equalizing members 25 and 26 are adapted to fit between the inner face of the rim 21 and the angular arms 15 and 16, and the said equalizing members 25 and 26 extend with their free ends beyond the middle of the inner face of the rim 21 and hence the pull exerted by the turnbuckle rods 13 and 14 on moving the latter toward each other is equally distributed on the rim 20 at the same time the hooks 17 and 18 are securely locked in place on the flange 20 of the rim 21. It will further be noticed that when the turnbuckle 10 is turned in the opposite direction and the turnbuckle rods 13 and 14 are moved from each other then the equalizing members 25 and 26 act on the rim so as to expand the same back to normal position, that is, after the tire is in position on the rim.

Figure 4:
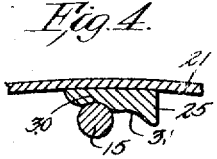
Fig. 4 is an enlarged sectional side elevation of the same on the line 4—4 of Fig. 2.
Figure 5:
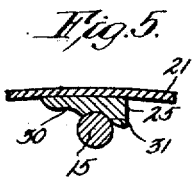
Fig. 5 is a similar view of the same with the equalizing member in a different position.

Each equalizing member 25, 26 has the outer flat face fitting against the inner face of the rim 21, while the inner face of the wedge-shaped member is provided with two wedges 30 and 31 of different thicknesses and either of the same is adapted to be seated on the corresponding arm 15 or 16 to compensate for any difference in the diameter of the rim on which the tool is used at the time (see Figs. 4 and 5).

The hooks 17 and 18 are preferably flattened at their ends to a width exceeding the diameters of the shanks 27, 28 thus preventing the equalizing members 25 and 26 from becoming accidentally disengaged from the hook shanks.

The tire rim tool shown and described is very simple and durable in construction and can be readily placed in position on the rim with a view to contract or expand the same as above explained.

It will further be noticed that by the use of the equalizing members 25 and 26 a straight pull is exerted on the split ends of the rim thus preventing the pulling of the rim out of shape when contracting the same.

Having thus described my invention, I claim as new and desire to secure by Letters Patent:—

1. In a tire rim tool, a turnbuckle having right and left threads, turnbuckle rods screwing at their inner ends in the said turnbuckle, the outer ends of the turnbuckle rods having integral angular arms terminating in hooks adapted to hook onto one of the flanges of an automobile wheel rim, and equalizing members mounted to swing on the shanks of said hooks in between the angular arms and the inner face of the rim.

2. In a tire rim tool, a turnbuckle having right and left threads, turnbuckle rods screwing at their inner ends in the said turnbuckle, the outer ends of the turnbuckle rods having integral angular arms terminating in hooks adapted to hook onto one of the flanges of an automobile wheel rim, and an equalizing member mounted to swing on the shanks of the said hooks and in between the angular arms and the inner face of the rim, each equalizing member having a flat face adapted to engage the inner face of the rim, and each having two wedge-shaped portions of different thickness forming the other face, either of the wedge-shaped portions being adapted to be seated on the corresponding angular arm.

HERMAN HENRY FISCHER.